March 11, 1952  T. Y. KORSGREN  2,588,636

NOISELESS SELF-ALIGNING BALL BEARING

Filed June 28, 1949

Inventor
Theodore Y. Korsgren

By W. S. McDowell
Attorney

Patented Mar. 11, 1952

2,588,636

UNITED STATES PATENT OFFICE 2,588,636

NOISELESS SELF-ALIGNING BALL BEARING

Theodore Y. Korsgren, Reynoldsburg, Ohio, assignor to Crise Manufacturing Company, Columbus, Ohio, a corporation of Ohio Application June 28, 1949, Serial No. 101,837

4 Claims. (Cl. 308—184)

This invention relates to bearings and more particularly to self-aligning ball bearings, and an object of the invention is to provide a light-capacity ball bearing which is adapted for substantially noiseless operation in electric motors and other machines.

An important use of such a bearing is in connection with small alternating current electric motors where, owing to the lightweight of the parts, there is a decided tendency on the part of the armatures of such motors to vibrate. This condition is attributable to the alternating magnetic fields of such motors and unless due compensation is made in the construction of the bearings, the condition results in objectionable noise and wear. Noise as a result of bearing chatter or vibration is often present in electric motors of the reversible shaped pole induction type, which are commonly used in the operation of furnace damper and valve controls and where the current for the motor is applied with the motor armature in a stalled position.

It has been proposed heretofore to employ metallic springs in such lightweight motor bearings which engage with the ball races of such bearings and exert longitudinally applied axially directed forces on one or more of the relatively movable members of such bearings to take up the looseness or play between bearing parts. Such metallic devices have been found to be unsatisfactory in that they fail to cushion the bearing properly against noise and vibration and because of their stiffness and limited resiliency, the same sometimes cause bearings to tighten the ball races excessively and thereby introduce too much compressing action and friction into the bearings for their successful operation.

Another object of the invention, therefore, is to produce a small and inexpensive self-aligning ball bearing involving a housing sleeve in which is mounted in coaxial, shaft-receiving order a pair of split race members having complemental reversely extending angular or arcuate surfaces forming a raceway for the reception of the circularly disposed ball members of the bearing, and wherein the ball-confining divided race members of the bearing are supported in their operating positions by vibration-receiving rings of compressive material, which serve to space the race members normally from the adjoining surfaces of the housing sleeve so that vibrational noise between adjacent parts is eliminated and the various parts of the bearing maintained at all times in proper operating relationship.

For a more detailed understanding of the present invention, reference is to be had to the following description and the accompanying drawing, wherein.

Figures 1, 2:
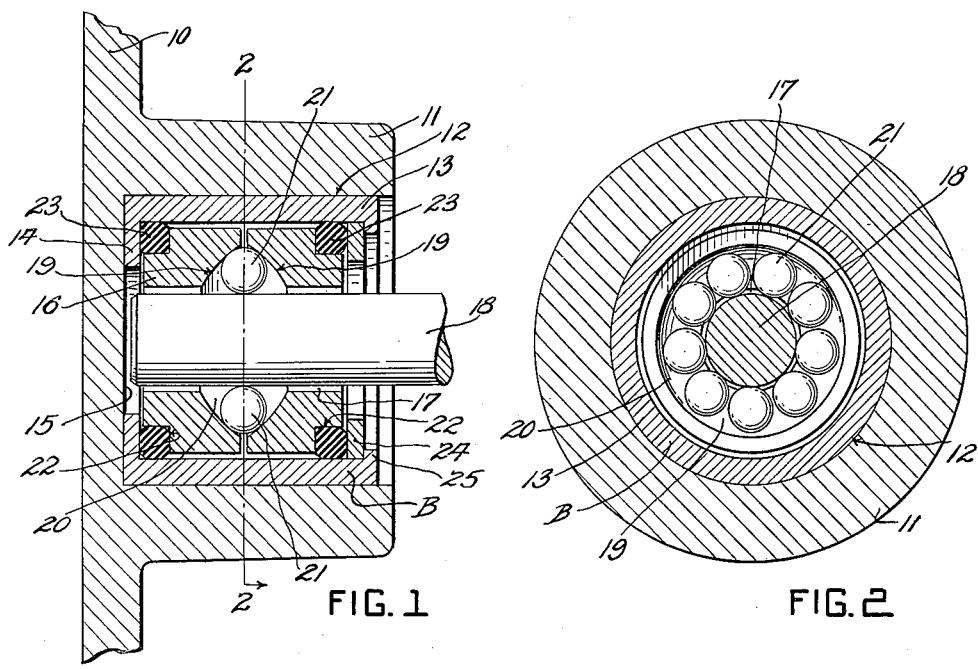
Fig. 1 is a vertical longitudinal sectional view taken through a ball bearing formed in accordance with the present invention.
Fig. 2 is a vertical transverse sectional view taken through the bearing on the plane indicated by the line 2—2 of Fig. 1.

Referring more particularly to the drawing, the numeral 10 designates a frame, casing or other machine or motor part having formed therewith a collar or hub extension 11 which defines a bearing-receiving socket 12, the latter being suitable for the reception of a ball bearing B constructed in accordance with the present invention.

The bearing comprises an annular housing or cage 13, preferably of metal, which is adapted to be forced into tight-fitting engagement with the wall surfaces of the socket 12, as illustrated in Figs. 1 and 2 of the drawings. In this instance, the housing is formed at one end thereof with an inturned seating flange 14 which is adapted to engage with the inner surface or bottom wall 15 of the socket 12 when the bearing is operatively assembled in the frame or casing 10 of an associated machine. Before being inserted in the socket 12, the bearing comprises a complete integrated unit, and has arranged within the housing or cage 13 thereof a pair of relatively separable longitudinally aligned metallic race members 16, said members being formed with axial openings 17 to receive a shaft or other rotatable member 18, the outer diameter of the latter being substantially less than the diameter of the opening 17. The race members include complemental reversely inclined annular raceways 19 which are relatively opposed so as to provide between the same a space 20 for the reception of circularly arranged ball members 21. The ball members engage with the raceways and with the motor shaft 18, supporting the latter in spaced relation from the axial opening 17 provided in said race members.

The ends of the race members are annularly recessed to provide shoulders shown at 22, and positioned on these shoulders are ring members 23 of vulcanized natural or synthetic rubber or other material having equivalent compressible and resilient properties.

Figures 3, 4:
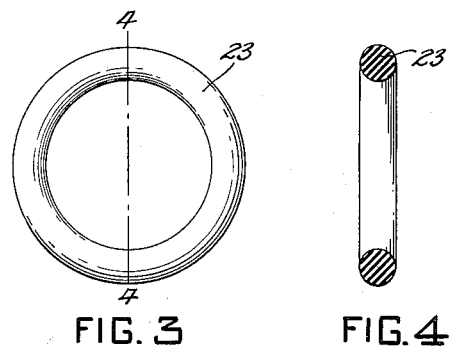
Fig. 3 is a front elevational view of one of the compressible race member supporting rings utilized by the present invention.
Fig. 4 is a transverse sectional view taken through the ring on the line 4—4 of Fig. 3.

The inner of the ring members engages with the inwardly directed seating flange 14 of the housing 13, while the outer ring member engages with a removable retaining washer or collar 24, the outer end of the housing being inwardly pressed, following insertion of the race and ring members therein, to form a lip 25, which holds the retaining collar against accidental removal and provides for the partial compaction or distortion of the cross-sectional configuration of the ring members when the latter are operatively positioned, as will be indicated by comparing the cross-sectional configuration of the ring members illustrated in Figs. 1 and 4 of the drawings. In Fig. 1, the ring members are under compaction, whereas in Fig. 4 the normal cross-sectional configuration of the ring member has been shown.

In view of the foregoing, it will be seen that the race members of the bearing are resiliently spaced from adjacent surfaces of the housing by the yieldable support afforded by the ring members. The construction provides a smoothly operating bearing and one which is devoid of the vibration, chatter and the usual noise normally present in bearings of this kind.

I claim:

1. A ball bearing comprising a sleeve-type housing, a pair of separable race members confined within said housing in longitudinal alignment therein, said race members being formed with shaft-receiving openings and with opposed raceways, ball members positioned in the space formed between the raceways, the ends of said race members being formed with annular shoulders, and ring members of compressible material positioned on the annular shoulders of said race members for normally spacing outer surfaces of said race members from adjacent surfaces of said housing.

2. A ball bearing comprising a sleeve-type housing, a pair of separable race members confined within said housing in longitudinal alignment therein, said race members being formed with shaft-receiving openings and with opposed raceways, ball members positioned in the space formed between the raceways, the ends of said race members being formed with annular shoulders, ring members of compressible material positioned on the annular shoulders of said race members for normally spacing outer surfaces of said race members from adjacent surfaces of said housing, and removable retaining means for confining said race and ring members in said housing against undue longitudinal movement.

3. A ball bearing comprising a sleeve-like housing formed at one end with an inwardly directed seating flange, a pair of relatively separable metallic race members disposed in longitudinal alignment within said housing, said race members being formed with axial shaft-receiving openings, said openings communicating with a raceway space formed between adjacent ends of said ring members, circularly arranged ball members positioned in said space for effecting the rotatable support of a shaft positioned in the openings of said race members, said race members having the ends thereof opposite to their raceway ends formed with annular shoulders, rings of rubber-like composition positioned on the shoulders of said race members and spacing the latter from the internal walls of said housing and its inwardly directed flange, and removable retaining means positioned in said housing at the end thereof opposite to its shouldered end for confining said rings and race members in their operative positions within the housing.

4. A ball bearing comprising a tubular housing; a pair of separate annular race members positioned in adjacent relation within said housing and formed with axially aligned shaft-receiving openings, said race members being formed at their adjacent ends with opposed concave surfaces defining between said race members an annular raceway; a multiplicity of ball devices occupying the raceway formed between said race members and projecting inwardly of the shaft-receiving openings of said race members for effecting the rotatable support of a shaft extending through the openings formed in said race members, said ball devices engaging the opposed concave surfaces of said race members and normally holding the adjacent ends of said race members in spaced apart relation; and resiliently compressible means positioned between said race members and said housing and isolating said race members from engagement with said housing, said last-named means being arranged to urge the concave surfaces of said race members into tight-fitting engagement with said ball devices.

THEODORE Y. KORSGREN.

REFERENCES CITED

The following references are of record in the file of this patent:

UNITED STATES PATENTS

| Number | Name | Date |
| --- | --- | --- |
| 1,979,663 | Bickelhaupt et al. | Nov. 6, 1934 |
| 1,980,580 | Gilmore | Nov. 13, 1934 |
| 2,302,742 | Crise | Nov. 24, 1942 |

FOREIGN PATENTS

| Number | Country | Date |
| --- | --- | --- |
| 11,708 | France | Apr. 20, 1910 |
| | (Addition to 393,181) | |